\# 3,560,617
PHARMACEUTICAL COMPOSITION CONTAINING 3-BUTYLAMINO - 4 - CHLORO-5-SULPHAMYL-BENZOIC ACIDS AND SALTS THEREOF FOR THE TREATMENT OF OEDEMATOUS CONDITIONS AND HYPERTENSION

Peter Werner Feit, Gentofte, and Herta Bruun, Esrom, near Graested, Denmark, assignors to Lovens Kemiske Fabrik Produktionsaktieselskab, Ballerup, Denmark
No Drawing. Filed June 4, 1968, Ser. No. 734,213
Claims priority, application Great Britain, June 5, 1967, 25,937/67
Int. Cl. A61k 27/00
U.S. Cl. 424—250     15 Claims

ABSTRACT OF THE DISCLOSURE

The invention relates to diuretic and saluretic preparations in dosage unit form, containing the hitherto unknown 3-butylamino-4-chloro-5-sulphamyl-benzoic acid or a salt thereof with a pharmaceutically acceptable base as the active component, if desired together with a hypotensor, the dose of the diuretic being between 10 and 150 mg., calculated as the free acid.

---

The invention further relates to a method of treating patients suffering from oedematous conditions and hypertension with the dosage units in question, administering from 10 to 300 mg. daily of the diuretic to the patient.

The present invention relates to a pharmaceutical composition for the treatment of oedematous conditions and hypertension, to dosage units of the composition, and to methods for the treatment of oedematous conditions and hypertension.

More particularly, the invention relates to a pharmaceutical composition containing as at least one active agent a member of the group selected from 3-butylamino-4-chloro-5-sulphamyl-benzoic acid and its salts with pharmaceutically acceptable inorganic or organic bases, together with auxiliary agents, and a dosage unit of the composition for the treatment oedematous conditions and hypertension.

The substance 3-butylamino-4-chloro-5-sulphamyl-benzoic acid is a new compound which may be prepared, for example, by 3-amino-4-chloro-5-sulphamyl-benzoic acid being alkylated at the N-atom in the 3-position, as hereinafter described.

3-butylamino-4-chloro-5-sulphamyl-benzoic acid possesses a favourable diuretic and saluretic activity. As far as the saluretic effect is concerned, the compound causes in particular an excretion of sodium and of chlorine in approximately equivalent proportions, while the excretion of the potassium ion remains substantially normal, or is only slightly increased.

Certain chlorosulphamylanthranilic acids with diuretic and/or saluretic properties are already known. The useful therapeutical properties of 3-butylamino-4-chloro-5-sulphamyl-benzoic acid, however, are in themselves surprising as the molecular structure of this acid differs from the said known anthranilic acids as far as the positions of the substituents in the molecule are concerned, and the more surprising as it is known from the field of disulphamylaniline diuretics that changing the position of the substituents may result in loss of activity as well as in the occurrence of side-effects, such as a carboanhydrase inhibition which causes a therapeutically undesirable kaliuresis.

It has been found that among a series of 3-R-amino-4-chloro-5-sulphamyl-benzoic acid, in which R represents alkyl, aralkyl, or a hetero radical, the 3-butylamino-4-chloro-5-sulphamyl-benzoic acid is superior in activity, which is surprising in view of the results of similar investigations within the field of chlorosulphamylanthranilic acids.

From a pharmaceutical point of view, it is a further advantage that 3 - butylamino - 4-chloro-5-sulphamyl-benzoic acid is chemically stable under acid conditions. Thus, for instance, no discoloration or loss in activity has been observed in pharmaceutical preparations containing the free acid, which when given orally is readily resorbed through the upper part of the gastro-intestinal tract and distributed in the body.

Specifically, it is advantageous that 3-butylamino-4-chloro-5-sulphamyl-benzoic acid has proved to be outstanding in having a diuretic effect which is comparable in type and activity to that of the well known diuretic Furosemide, belonging to the group of chlorosulphamylanthranilic acids, while being much less toxic than the said compound of reference.

In order to determine the acute toxicity, doses of up to 1000 mg./kg. were injected intravenously into mice. With the highest dose, 4 out of 10 mice died within a few minutes after the injection showing spastic extensions of the hind-limbs and respiratory arrest. All mice not dying within the first hour after the injection recovered. The application of higher doses was prohibited by difficulties in preparing solutions of adequate concentrations. The acute $LD_{50}$ is thus estimated at near to or slightly above a dose of 1000 mg./kg. intravenously, the corresponding value for Furosemide being 308 mg./kg. according to Muschaweck et al., Arzneimittel-Forsch. 14. 44, 1964.

The cronic toxicity has been investigated in animal tests, the test animals being dogs. Daily oral administration of 25 mg./kg. of 3-butylamino-4-chloro-5-sulphamyl-benzoic acid over a period of several months resulted in a pronounced dehydration in the mongrel dogs used.

Haematological examinations, performed at weekly intervals during the administration, gave values within the normal range for glucose, bilirubin, prothrombinproconvertin time, sedimentation rate, plasma proteins, alkaline phosphatase, and GO- and GP-transaminases. The number and distribution of leucocytes remained normal. Haemoglobin and erythrocyte values indicated some haemoconcentration. A rise in plasma urea and a questionable increase in creatinin were noted. Plasma electrolyte values after 3 weeks medication were normal. Urine analysis showed no abnormalities. Histological examinations revealed no pathological changes.

The diuretic and saluretic activity of 3-butylamino-4-chloro-5-sulphamyl-benzoic acid was primarily determined in animal experiments in which the test animals, dogs, after a control period of 2 hours were injected intravenously with doses between 0.5 and 16 mg./kg. of the substance in the form of its sodium salt. The bladder was emptied by catheter at hourly intervals if the dogs did not void spontaneously. Besides the volume of urine, the amounts of Na, K, and Cl excreted were determined. Oral doses in the range from 1 to 16 mg./kg. were tested in the same manner.

In all experiments the diuretic effect was only apparent within the first 3 hours after the intravenous injection, 75 to 90 percent of the total excretion occurring within the first hour. For comparison purposes, Furosemide was given in the same doses. Both drugs proved to be of substantially the same diuretic potency in the range from 2 to 16 mg./kg. and the excretion of potassium was equally low for both compounds. When administered by the oral route in doses between 4 and 8 mg./kg., a diuresis from 15 to 30 ml./kg., an excretion from 1.5 to 3.1 meq./kg. of the sodium ion and an excretion from 0.6 to 0.9 meq./kg. of the potassium ion could be observed, whereas the corresponding values for the control animals were 2 ml./kg., 0.15 meq./kg., and 0.1 meq./kg., respectively.

Thus, the 3-butylamino-4-chloro-5-sulphamyl-benzoic acid causes approximately a tenfold excretion of water, and of the sodium ion, when administered in therapeutically acceptable doses.

Accordingly, it is the object of the invention to provide a pharmaceutical composition with diuretic and saluretic effect which is useful in the treatment of oedematous conditions, e.g. cardiac, hepatic, renal, lung, and brain oedema, in oedematous conditions during pregnancy, and other pathological conditions disturbing the balance of the electrolyte concentration in the body, for example in the form of an abnormal retension of the sodium ion, in the treatment of congestive heart failure, and in the treatment of hypertension.

With this object in view the compositions of the invention contain as at least one active component a member of the group consisting of 3-butylamino-4-chloro-5-sulphamyl-benzoic acid and its pharmaceutically acceptable salt with inorganic and organic bases, together with solid or liquid pharmaceutical carriers and auxiliary agents.

In the said compositions, the proportion of therapeutically active material to carrier substances can vary between 0.5% and 90%.

The compositions in question can either be worked up to pharmaceutical forms of presentation, such as tablets, pills, dragées, and suppositories, or the composition can be filled in medical containers such as capsules or ampules or, as far as mixtures are concerned, these may be filled in bottles or tubes and similar containers.

Pharmaceutical organic or inorganic, solid or liquid carriers suitable for enternal and parenteral administration can be used to make up the compositions. For example, water, gelatine, lactose, starch, magnesium stearate, talc, vegetable and animal oils and fats, benzyl alcohol, gum, polyalkylene glycol, petroleum jelly, cocoa butter, lanolin or other known carriers for medicaments are all suitable as carriers here, while stabilizing agents, wetting or emulsifying agents, salts for varying the osmotic pressure, and buffers for securing an adequate pH-value of the composition, can be used as auxiliary agents.

Among suitable salts of 3-butylamino-4-chloro-5-sulphamyl-benzoic acid for use in the present compositions, mention may be made of the alkali metal salts, the alkali-earth metal salts, the ammonium salt, and salts with organic bases, such as the ethanol amine salt and the diethanol amine salt. Besides, the free acid may itself also be used in a composition according to the invention.

Thus, for preparations in the form of tablets or the like, or in injectable preparations, the sodium salt or the potassium salt may be used, being sufficiently water-soluble. For injectable preparations, however, salts with certain organic bases may advantageously be employed due to their high solubility in water.

The free acid may be administered in capsules, or in tablets, of which the latter may be effervescence tablets in order to obtain a quick resorption, or they may be sustained-release tablets in order to obtain a prolonged effect which may be desirable in the treatment of hypertension.

Besides the 3-butylamino-4-chloro-5-sulphamyl-benzoic acid or a salt thereof, the compositions of the invention may contain other suitable active components in the treatment of hypertension and oedematous conditions, such as hypotensors, as hydralazin, methyldopa, reserpine and other Rauwolfia serpentina alkaloids and/or tranquilizers, such as meprobamate.

Another object of the invention resides in the selection of a dose of the 3-butylamino-4-chloro-5-sulphamyl-benzoic acid, or one of its salts, which can be administered so that the desired activity is achieved without simultaneous secondary effects. It has been found that 3-butylamino-4-chloro-5-sulphamyl-benzoic acid and its salts are conveniently administered in dosage units containing not less than 10 mg., and preferable from 20 to 150 mg., calculated as the free 3-butylamino-4-chloro-5-sulphamyl-benzoic acid.

The term "dosage unit" as used here is meant to cover a single dose capable of being administered to the patients, which may be readily handled and packed, remaining as a physically stable unit dose comprising either the active material as such, or a mixture of it with solid or liquid pharmaceutical diluents or carriers.

If the composition is to be injected, a sealed ampul, a vial or a similar container may be provided, containing as a dosage unit a parenterally acceptable aqueous or oily injectable solution or dispersion of the active material.

It is still another object of the invention to provide a method of treating patients suffering from oedematous conditions and hypertension, the method comprising administering to the patient from 10 to 300 mg. per day of 3-butylamino-4-chloro-5-sulphamyl-benzoic acid or a corresponding dose of one of its salts with pharmaceutically acceptable bases. Preferably, the compound is given in the form of the dosage unit aforesaid.

For oral administration, the dosage unit may conveniently contain from 20 to 150 mg. of the 3-butylamino-4-chloro-5-sulphamyl-benzoic acid, as such or in the form of one of its salts, in the form of tablets, pills, or capsules to be given at suitable intervals, for instance once, twice, or thrice daily, always depending, however, on the patient and his condition. Preferably the tablets contain from 30 to 100 mg. each of the 3-butylamino-4-chloro-5-sulphamyl-benzoic acid or one of its salts. If the dosage unit is injectable, the unit will conveniently consist of from 10 to 50 mg. of the 3-butylamino-4-chloro-5-sulphamyl-benzoic acid, dissolved in an aqueous solvent, the said dosage unit for instance being enclosed in an ampule containing 2 ml. of 1 percent aqueous solution of the sodium salt of 3-butylamino-4-chloro-5-sulphamyl-benzoic acid.

The parenteral preparations are in particular useful in the treatment of conditions in which a quick dehydration is desirable, e.g. in the intensive therapy in the case of oedemas in the lung. In the continuous therapy of patients suffering from e.g. hypertension, the tablets or capsules may be the appropriate form of pharmaceutical preparation owing to the prolonged effect obtained when the drug is given orally.

In the treatment of heart failure and hypertension such tablets may advantageously contain other active components, as specified hereinbefore.

Thus for instance such tablets may contain each 40 mg. of the 3-butylamino-4-chloro-5-sulphamylbenzoic acid or one of its salts in combination with hydralazine in amounts from 10 to 50 mg. or reserpine in amounts from 0.05 to 0.5 mg. or methyldopa in amounts from 100 to 500 mg., and furthermore the tablets may contain, as a tranquilizer, meprobamate (2:2-di(carbamoyloxymethyl)-pentane) in amounts from 100 to 400 mg., preferably at least 150 mg. and not more than 250 mg.

A method of producing 3-butylamino-4-chloro-5-sulphamyl-benzoic acid and salts thereof will be described in details in the following.

(a) 5-chlorosulphonyl-4-chloro-3-nitro-benzoic acid

To a mixture of 250 ml. of concentrated $H_2SO_4$ and 160 ml. of concentrated $HNO_3$, a solution of 114 g. of 4-chloro-3-chlorosulphonyl-benzoic acid in 620 ml. of concentrated $H_2SO_4$ was added with stirring over a period of 1 hour. The temperature was then raised to 85° C., and the reaction mixture was stirred for an additional 6 hours. After cooling, the mixture was poured onto ice, and the precipitate was filtered off and washed with water. After drying and recrystallization, 91 g. of 5-chlorosulphonyl-4-chloro-3-nitro-benzoic acid were obtained with M.P. 193–194° C. (decomp.).

(b) 4-chloro-3-nitro-5-sulphamyl-benzoic acid 90 g. of 5-chlorosulphonyl-4-chloro-3-nitro-benzoic acid were slowly added to 160 ml. of concentrated aqueous ammonia (25% $NH_3$) with stirring and cooling. After 2 hours of stirring, the excess ammonia was removed in vacuo, and the precipitated ammonium salt of 4-chloro-3-nitro-5-sulphamyl-benzoic acid was collected by filtration and washed with ice-water. The moist filter cake was dissolved in 300 ml. of boiling 4 N hydrochloric acid. The resulting solution was cooled, and the precipitated 4-chloro-3-nitro-5-sulphamyl-benzoic acid was filtered off and washed with water. After recrystallization from water and subsequent drying, 60 g. of the acid were obtained with M.P. 235–236.5° C. (decomp.).

(c) 3-amino-4-chloro-5-sulphamyl-benzoic acid

A mixture of 67 g. of iron powder, 6.4 g. of ammonium chloride, and 200 ml. of water was heated to 70° C. 0.5 ml. of concentrated hydrochloric acid were added, and the mixture was heated on a steam bath with stirring, 57 g. of 4-chloro-3-nitro-5-sulphamyl-benzoic acid being added in portions over a period of 2 hours. After additional heating and stirring for 14 hours, the reaction mixture was cooled and filtered by suction. The moist filter cake was suspended in 100 ml. of water, and by the addition of 2 N sodium hydroxide the pH was adjusted to 8. The mixture was filtered, and the process repeated with the filter cake. The combined filtrates were acidified to a pH of 2 to 3, and the precipitated acid was collected by suction and washed with water. After recrystallization from water and subsequent drying, 40 g. of 3-amino-4-chloro-5-sulphamyl-benzoic acid were obtained with M.P. 261–261.5° C.

(d) 3-butylamino-4-chloro-5-sulphamyl-benzoic acid

A suspension of 10 g. of 3-amino-4-chloro-5-sulphamyl-benzoic acid in 75 ml. of n-butanol containing 0.1 g. of p-toluenesulphonic acid was refluxed, while the water formed by the esterification process was simultaneously removed by azeotropic destillation. To the clear solution of the resulting butyl - 3-amino-4-chloro-5-sulphamyl-benzoate, 9.1 g. of butyl-p-toluene-sulphonate were added, and the reaction mixture was further boiled for 96 hours under reflux. Then the butanol was removed by evaporation in vacuo. The residue was dissolved in 80 ml. of 2 N aqueous sodium hydroxide and the solution was heated on a steam bath for 1 hour. The mixture was cooled and extracted with diethyl ether. From the aqueous layer, the sodium salt of 3-butylamino-4-chloro-5-sulphamyl-benzoic acid crystallized after the pH had been adjusted to 7.5 by addition of 4 N hydrochloric acid. The salt was filtered off, and washed with water. 3 g. of the sodium salt were dissolved in 30 ml. of hot water, 2 ml. of acetic acid were added, and the precipitated 3-butylamino-4-chloro-5-sulphamyl-benzoic acid was filtered off from the cooled solution, yielding the pure compound with M.P. 238–240° C.

(e) Diethanolamine salt of 3-butylamino-4-chloro-5-sulphamyl-benzoic acid 3.07 g. of 3-butylamino-4-chloro-5-sulphamyl-benzoic acid were dissolved in 25 ml. of hot butanol, and a solution of 1.0 g. of diethanolamine in 10 ml. of butanol was added. After cooling, the precipitated diethanolamine salt was collected by filtration to yield the pure salt with M.P. 105° C.

(f) Calcium salt of 3-butylamino-4-chloro-5-sulphamyl-benzoic acid 3.07 g. of 3-butylamino-4-chloro-5-sulphamyl-benzoic acid were dissolved in 50 ml. of 0.2 N LiOH. Addition of 2.5 ml. of a saturated $CaCl_2$-solution precipitated the calcium salt. The salt was collected by filtration and dried in air. The salt crystallized with 3 moles water of crystallization.

(g) Potassium salt of 3-butylamino-4-chloro-5-sulphamylbenzoic acid 15.35 g. of 3-butylamino-4-chloro-5-sulphamyl-benzoic acid were suspended in 20 ml. of boiling water. 2 N KOH was added until a clear solution of pH 7.5 was reached. After cooling, the precipitated potassium alt was filtered off and dried at 120° C.

The following, non-limiting examples serve to illustrate the preparation of the compositions of the invention.

EXAMPLE I

Capsules containing the free 3-butylamino-4-chloro-5-sulphamyl-benzoic acid

| Ingredients: | G. |
|---|---|
| Micronized 3 - butylamino - 4-chloro - 5-sulphamylbenzoic acid | 60 |
| Lactose | 300 |
| Talc | 15 |

The ingredients were mixed and passed through a 60 mesh per linear inch sieve and subsequently further mixed for 15 minutes. The mixture was filled into No. 1 gelatine capsules (Parke, Davis and Co.) using a semi-automatic capsule-filling machine shaken by vibrator. Each capsule contains 250 mg. of the mixture corresponding to 1500 capsules each of 40 mg. of the free 3-butylamino-4-chloro-5-sulphamyl-benzoic acid.

The effect of the compositions was tested as follows:
Five healthy persons received each 2 capsules corresponding to 80 mg. of the drug, whereafter the urinary excretion was observed for 24 hours. The average effect appears from the following table.

DIURETIC AND SALURETIC EFFECT OF 3-BUTYLAMINO-4-CHLORO-5-SULPHAMYL-BENZOIC ACID

| | | Urinary excretion 0–6 hours, 6–24 hours and 0–24 hours | | | | | | | | | | | |
|---|---|---|---|---|---|---|---|---|---|---|---|---|---|
| | | Volume (ml.) | | | Sodium (meq.) | | | Chloride (meq.) | | | Potassium (meq.) | | |
| | Mg. | 0–6 | 6–24 | 0–24 | 0–6 | 6–24 | 0–24 | 0–6 | 6–24 | 0–24 | 0–6 | 6–24 | 0–24 |
| Control | 0 | 429 | 604 | 1,033 | 33 | 58 | 91 | 32 | 62 | 94 | 17 | 25 | 42 |
| Drug | 80 | 1,083 | 446 | 1,529 | 121 | 29 | 150 | 145 | 28 | 173 | 24 | 23 | 47 |

EXAMPLE II

Tablets containing free 3-butylamino-4-chloro-5-sulphamylbenzoic acid

| Ingredients: | G. |
|---|---|
| 3-butylamino - 4 - chloro-5-sulphamyl-benzoic acid | 120 |
| Corn starch | 285 |
| Lactose | 300 |
| Talc | 45 |

The ingredients were mixed and screened through a 20 mesh per linear inch sieve and subsequently treated with an aqueous solution of gelatine (4 percent) in sufficient amount to form a granulate. The granulate was dried and broken on a 16 mesh per linear inch sieve. After addition of talc the granulate was compressed into tablets of 250 mg. using 9 mm. punches and dies, yielding 3000 tablets each containing 40 mg. of the free 3-butylamino-4-chloro-5-sulphamyl-benzoic acid.

EXAMPLE III

Tablets containing the potassium salt of 3-butyl-amino-4-chloro-5-sulphamyl-benzoic acid Ingredients: G.
- 3-butylamino-4-chloro-5-sulphamyl-benzoic acid as the potassium salt _____ 125
- Lactose _____ 625
- Corn starch _____ 750

The potassium salt was mixed with the other ingredients and granulated after moistening with a 10 percent aqueous solution of polyvinylpyrrolidone.

The granulate was dried and broken on a 16 mesh per linear inch sieve. After addition of 100 g. talc and 10 g. of magnesium stearate, and mixing, the mixture was compressed into tablets using 10 mm. punches and dies, yielding tablets of 340 mg. and containing 43 mg. of 3-butyl-amino-4-chloro-5-sulphamyl-benzoic acid each.

EXAMPLE IV

Ampules containing the sodium salt of 3-butyl-amino-4-chloro-5-sulphamyl-benzoic acid Ingredients: G.
- 3-butylamino - 4 - chloro-5-sulphamyl - benzoic acid _____ 10.0
- Sodium hydroxide _____ 1.3
- Sodium chloride _____ 4.0
- Sterile water up to 1000 ml.

The ingredients were dissolved in the water, and the solution was sterilized by filtration. The sterile solution was thereafter filled into ampules under aseptic conditions, yielding 500 ampules of 2 ml. each.

EXAMPLE V

Tablets containing 3-butylamino-4-chloro-5-sulphamyl-benzoic acid as its potassium salt, and reserpine Ingredients: G.
- 3-butylamino-4-chloro - 5 - sulphamyl-benzoic acid as the potassium salt _____ 430
- Reserpine _____ 0.1
- Lactose _____ 1249
- Corp starch _____ 1500

The reserpine was triturated with 100 g. of lactose, and the mixture was forced through a 30 mesh per linear inch sieve. Thereafter the other ingredients were incorporated, and the mixture was granulated with sufficient ethly alcohol/water (60 percent). The granulate was dried and broken on a 16 mesh per linear inch sieve. After addition of 200 g. of talc and 20 g. of magnesium stereate, and mixing, the mixture was compressed into tablets using 10 mm. punches and dies, yielding tablets of 340 mg. containing 40 mg. of 4-butylamino-4-chloro-5-sulphamyl-benzoic acid and 0.1 mg. of reserpine.

In a similar manner, tablets were prepared which contained 40 mg. of 3-butylamino-4-chloro-5-sulphamyl-benzoic acid as the free acid, and 10 mg. of hydralazine.

EXAMPLE VI

Capsules containing 3-butylamino-4-chloro-5-sulphamyl-benzoic acid and methyldopa Ingredients: G.
- 3-butylamino-4-chloro - 5 - sulphamyl - benzoic acid _____ 80
- Lactose _____ 100
- Talc _____ 15
- D,L-methyldopa _____ 200

The ingredients were mixed and passed through a 60 mesh per linear inch sieve. The resultant mixture was subdivided and formed into capsules each containing 40 mg. of the free 3-butylamino-4-chloro-5-sulphamyl-benzoic acid and 100 mg. of D,L-methyldopa.

What we claim is:

1. A pharmaceutical preparation in dosage unit form for the treatment of patients suffering from oedematous conditions and hypertension, comprising as at least one active component a member of the group consisting of 3-butylamino-4-chloro-5-sulphamyl-benzoic acid and its non-toxic salts together with a non-toxic pharmaceutically acceptable carrier, the quantity of the said active component in the uint being between 10 and 150 mg., calculated as the free 3-butylamino-4-chloro-5-sulphamyl-benzoic acid.

2. A pharmaceutical preparation in oral dosage unit form according to claim 1, in which the units contain from 10 to 150 mg. of an alkali metal salt 3-butylamino-4-chloro-5-sulphamyl-benzoic acid.

3. A pharmaceutical preparation in oral dosage unit form according to claim 1, in which the units contain from 10 to 150 mg. of the free 3-butylamino-4-chloro-5-sulphamyl-benzoic acid.

4. A pharmaceutical preparation in dosage unit form according to claim 1, which contains, as a diuretic, a member of the group consisting of 3-butylamino-4-chloro-5-sulphamyl-benzoic acid and its non-toxic salts, and as a hypotensor a *Rauwolfia serpentina* alkaloid with hypotensive activity, together with a non-toxic pharmaceutically acceptable carrier, the quantity of the diuretic being 10 to 150 mg. calculated as the free 3-butylamino-4-chloro-5-sulphamyl-benzoic acid, and the quantity of hypotensor being between 0.05 and 0.5 mg.

5. A pharmaceutical preparation in dosage unit form as claimed in claim 4, which also contains 2:2-di(carbamoyloxymethyl)-pentane in an amount between 100 and 400 mg.

6. A pharmaceutical preparation in dosage unit form according to claim 1, which contains, as a diuretic, a member of the group consisting of 3-butylamino-4-chloro-5-sulphamyl-benzoic acid and its non-toxic salts, and as a hypotensor hydralazine, together with a non-toxic pharmaceutically acceptable carrier, the quantity of the diuretic being between 10 and 150 mg. calculated as the free 3-butylamino-4-chloro-5-sulphamyl-benzoic acid, and the quantity of hydralazine being between 5 and 50 mg.

7. A pharmaceutical preparation in dosage unit form as claimed in claim 6, which also contains 2:2-di(carbamoyloxymethyl)-pentane in an amount between 100 and 400 mg.

8 A pharmaceutical preparation in dosage unit form according to claim 1, which contains, as a diuretic, a member of the group consisting of 3-butylamino-4-chloro-5-sulphamyl-benzoic acid and its non-toxic salts, and as a hypotensor methyldopa, together with a non-toxic pharmaceutically acceptable carrier, the quantity of the diuretic being beween 10 and 150 mg. calculated as the free 3-butylamino-4-chloro-5-sulphamyl-benzoic acid, and the quantity of methyldopa being between 100 and 500 mg.

9. A pharmaceutical preparation in dosage unit form as claimed in claim 8, which also contains 2:2-di(carbamoyloxymethyl)-pentane in an amount between 100 and 400 mg.

10. An injectable pharmaceutical preparation in dosage unit form, in which the units contain from 10 to 50 mg. of 3-butylamino-4-chloro-5-sulphamyl-benzoic acid in the form of a non-toxic salt, dissolved in an aqueous medium.

11. The method of treating patients suffering from oedematous conditions and hypertension, which comprises administering to the patient from 10 to 300 mg. per day of a member of the group consisting of 3-butyl-amino-4-chloro-5-sulphamyl-benzoic acid and its non-toxic salts.

12. A method as claimed in claim 11, which comprises the oral administration of an alkali metal salt of 3-butylamino-4-chloro-5-sulphamyl-benzoic acid in the form of tablets.

13. A method as claimed in claim 11, which comprises the oral administration of the free 3-butylamino-4-chloro-5-sulphamyl-benzoic acid in the form of tablets.

14. A method as claimed in claim 11, which comprises the oral administration of the free 3-butylamino-4-chloro-5-sulphamyl-benzoic acid in the form of capsules.

15. A method as claimed in claim 11, which comprises subcutaneous or intravenous injection of an aqueous solution of a non-toxic salt of 3-butylamino-4-chloro-5-sulphamyl-benzoic acid in doses from 10 to 50 mg. per day.

References Cited

UNITED STATES PATENTS 3,050,553   8/1962   Novello _____ 424—319

SAM ROSEN, Primary Examiner

U.S. Cl. X.R.

260—518; 424—262, 300, 319